United States Patent
Cox et al.

[11] Patent Number: 6,154,571
[45] Date of Patent: Nov. 28, 2000

[54] ROBUST DIGITAL WATERMARKING

[75] Inventors: Ingemar J. Cox, Lawrenceville; Matthew L. Miller, Princeton, both of N.J.; Ryoma Oami, Tokyo, Japan

[73] Assignees: NEC Research Institute, Inc., Princeton, N.J.; NEC Corporation, Tokyo, Japan

[21] Appl. No.: 09/118,467

[22] Filed: Jul. 17, 1998

Related U.S. Application Data

[60] Provisional application No. 60/090,532, Jun. 24, 1998.

[51] Int. Cl.$^7$ ..................................... G06K 9/00
[52] U.S. Cl. ........................... 382/250; 382/232; 382/100
[58] Field of Search .................... 382/100, 232, 382/250, 276, 251, 252, 244

[56] References Cited

U.S. PATENT DOCUMENTS

| | | | |
|---|---|---|---|
| 4,939,515 | 7/1990 | Adelson | 341/51 |
| 5,319,735 | 6/1994 | Preuss et al. | 395/2.14 |
| 5,530,751 | 6/1996 | Morris | 380/4 |
| 5,530,759 | 6/1996 | Braudaway et al. | 380/54 |
| 5,568,570 | 10/1996 | Rabbani | 382/238 |
| 5,613,004 | 3/1997 | Cooperman et al. | 380/28 |
| 5,636,292 | 6/1997 | Rhoads | 382/232 |
| 5,646,997 | 7/1997 | Barton | 380/23 |
| 5,659,726 | 8/1997 | Sandford, II et al. | 395/612 |
| 5,664,018 | 9/1997 | Leighton | 380/54 |
| 5,687,236 | 11/1997 | Moskowitz et al. | 380/28 |
| 5,809,139 | 9/1998 | Girod et al. | 380/202 |
| 6,037,984 | 3/2000 | Isnardi et al. | 348/403 |

FOREIGN PATENT DOCUMENTS

| | | | |
|---|---|---|---|
| 0690595 | 1/1995 | European Pat. Off. | H04L 9/18 |
| 2196167 | 4/1988 | United Kingdom | G11B 20/08 |
| 8908915 | 9/1989 | WIPO | G11B 21/10 |
| 9520291 | 7/1995 | WIPO | H04N 1/32 |
| 9621290 | 7/1996 | WIPO | H04H 1/00 |
| 9625005 | 8/1996 | WIPO | H04N 7/08 |
| 9627259 | 9/1996 | WIPO | H04N 1/32 |

OTHER PUBLICATIONS

R.G. Van Schyndel et al, "A digital watermark," in Intl. Conf. On Image Processing, vol. 2, pp. 86–90, 1994.

G. Caronni, "Assuring Ownership Rights for Digital Images," in Proc. Reliable IT Systems, VIS '95, 1995.

J. Brassil et al, "Electronic Marking and Identification Techniques to Discourage Document Copying," in Proc. Infocom '94, pp. 1278–1287, 1994.

(List continued on next page.)

*Primary Examiner*—Bijan Tadayon
*Assistant Examiner*—Shervin Nakhjavan
*Attorney, Agent, or Firm*—Philip J. Feig

[57] ABSTRACT

A watermarking procedure that is applicable to images, audio, video and multimedia data to be watermarked divides the data to be watermarked into a set of n×n blocks, such as the 8×8 blocks of MPEG. The same watermark signal can be distributed throughout the set of blocks in a large variety of ways. This allows the insertion algorithm to be changed without affecting the decoders. The decoding procedure first sums together the DCT coefficients of N sets of 8×8 blocks to form a set of N summed 8×8 blocks and then extracts the watermark from the summed block. Since the sum of the DCT blocks is equal to the DCT of the sum of the intensity blocks, efficient decoding can occur in both the spatial and frequency domains. The symmetric nature of the decoding process allows geometric distortions to be handled in the spatial domain and other signal distortions to be handled in the frequency domain. Moreover, insertion of a watermark signal into image data and the subsequent extraction of the watermark from watermarked image data which has been subject to distortion between the times of insertion and extraction involves the insertion of multiple watermarks designed to survive predefined distortions of the image data, such as panscan or letterbox mode transformations. Alternatively, a registration pattern in the image data, after the image data containing the registration pattern is subject to an unknown distortion, is used to compensate for distortion of the watermarked image data.

10 Claims, 10 Drawing Sheets

OTHER PUBLICATIONS

K. Tanaka et al, "Embedding Secret Information into a Dithered Multi–level Image," in IEEE Military Comm. Conf., pp. 216–220, 1990.

K. Matsui et al, "Video–Steganography: How to Secretly Embed a Signature in a Picture," in IMA Intellectual Property Project Proc., vol. 1, pp. 187–206, 1994.

Macq and Quisquater, "Cryptology for Digital TV Broadcasting," in Proc. of the IEEE, vol. 83, No. 6, pp. 944–957, 1995.

W. Bender et al, "Techniques for data hiding," in Proc. of SPIE, vol. 2420, No. 40, Feb. 1995.

Koch, Rindfrey and Zhao, "Copyright Protection for Multimedia Data," in Proc. of the Int'l Conf. on Digital Media and Electronic Publishing (Leeds, UK, Dec., 6–8, 1994).

Koch and Zhao, "Towards Robust and Hidden Image Copyright Labeling," in Proc. of 1995 IEEE Workshop on Nonlinear Signal and Image Processing (Neos Marmaras, Halkidiki, Greece, Jun. 20–22, 1995.

"Digital Copyright: Who Owns What?" NewMedia, Sep. 1995, pp. 38–43.

"Publish and Be Robbed?" New Scientist, Feb. 18, 1995, pp. 32–37.

Kohno et al, "Spread Spectrum Access Methods for Wireless Communications," in IEEE Communications Magazine, Jan. 1995, pp. 58–67.

Campana and Quinn, "Spread spectrum communications," in IEEE Potentials, Apr. 1993, pp. 13–16.

Mowbray and Grant, "Wideband coding for uncoordinated multiple access communication," in Electronics & Communication Engineering Journal, Dec. 1992, pp. 351–361.

Digimarc Overview & "Wired" Magazine article (Jul. 1995 issue)—Jun. 1995.

A.G. Bors et al., "Image Watermarking Using DCT Domain Constraints", Dept. Of Informatics, University of Thessaloniki.

I.J. Cox et al., "Secure Spread Spectrum Watermarking for Multimedia", NEC Research Institute, Technical Report 95–10.

H.S. Stone, "Analysis of Attacks on Image Watermarks with Randomized Coefficients", NEC Research Institute, May 17, 1996.

F.M. Boland et al., "Watermarking Digital Images for Copyright Protection", Image Processing and its Applications, Jul. 4–6, 1995, Conference Publication No. 410, pp. 326–330.

L. Boney et al., "Digital Watermarks for Audio Signals".

Swanson et al., "Transparent Robust Image Watermarking", Proc. IEEE Int. Conf. On Image Proc. 1996.

J.J.K. O Ruanaidh et al., "Phase Watermarking of Digital Images".

I. Pitas, "A Method for Signature Casting on Digital Images".

C.T. Hsu et al., "Hidden Signatures in Images", ICIP 96 Conf. Proc., Sep. 16–19, 1996.

M. Schneider et al., "A Robust Content Based Digital Signature for Image Authentication", ICIP 96 Conf. Proc., Sep. 16–19, 1996.

S. Roche et al., "Multi–Resolution Access Control Algorithm Based on Fractal Coding", ICIP 96 Conf. Proc., Sep. 16–19, 1996.

K. Hirotsugu, "An Image Digital Signature System with ZKIP for the Graph Isomorphism", ICIP 96 Conf. Proc., Sep. 16–19, 1996.

R.B. Wolfgang et al., "A Watermark for Digital Images".

J.J.K. O Ruanaidh et al., "Watermarking Digital Images for Copyright Protection", EVA 96 Florence, pp. 1–7.

T. Aura, "Invisible Communication", Nov. 6, 1995.

D. Kahn, "Information Hiding—An Annotated Bibliography", Macmillan 1967, Library of Congress catalog No. 63–16109.

Craver et al., "Can Invisible Watermarks Resolve Rightful Ownership?", IBM Research Report, RC 20509, Jul. 25, 1996.

Podilchuk et al., "Digital Image Watermarking Using Visual Models", Proc. of EI'97, vol. 3016, Feb. 9–14, 1997.

Cox et al., "A review of watermarking and the importance of perceptual modeling", Proc. of EI'97, vol. 3016, Feb. 9–14, 1997.

Watson, "DCT quantization matrices visually optimized for individual images", SPIE, vol. 1913, pp. 202–216.

Ahumada, Jr. et al., "Luminance–Model–Based DCT Quantization for Color Image Compression", SPIE, vol. 1666 (1992), pp. 365–374.

Hartung et al., "Digital Watermarking of Raw and Compressed Video", Systems for Video Communication, Oct. 1996, pp. 205–213.

ROBUST DIGITAL WATERMARKING

CROSS-REFERENCE TO RELATED APPLICATIONS

This is a conversion of provisional application Ser. No. 60/090,532, filed Jun. 24, 1998.

FIELD OF THE INVENTION

The present invention relates to digital watermarking of data including image, video and multimedia data. Specifically, the invention relates to insertion and detection or extraction of embedded signals for purposes of watermarking, in which the insertion and detection procedures are applied to sums of subregions of the data. When these subregions correspond to the 8×8 pixel blocks used for MPEG and JPEG compression and decompression, the watermarking procedure can be tightly coupled with these compression algorithms to achieve very significant savings in computation. The invention also relates to the insertion and detection of embedded signals for the purposes of watermarking, in which the watermarked data might have undergone distortion between the times of insertion and detection of the watermark.

BACKGROUND OF THE INVENTION

The proliferation of digitized media such as image, video and multimedia is creating a need for a security system that facilitates the identification of the source of the material.

Content providers, i.e. owners of works in digital data form, have a need to embed signals into video/image/multimedia data, which can subsequently be detected by software, and/or hardware devices for purposes of authentication of copyright ownership, and copy control and management.

For example, a coded signal might be inserted in data to indicate that the data should not be copied. The embedded signal should preserve the image fidelity, be robust to common signal transformations and resistant to tampering. In addition, consideration must be given to the data rate that can be provided by the system, though current requirements are relatively low—a few bits per frame.

In U.S. patent application Ser. No. 08/534,894, filed Sep. 28, 1995, entitled "Secure Spread Spectrum Watermarking for Multimedia Data", which is incorporated herein by reference, there was proposed a spread spectrum watermarking method which embedded a watermark signal into perceptually significant regions of an image for the purposes of identifying the content owner and/or possessor. A strength of this approach is that the watermark is very difficult to remove. In fact, this method only allows the watermark to be read if the original image or data is available for comparison. This is because the original spectrum of the watermark is shaped to that of the image through a non-linear multiplicative procedure, and this spectral shaping must be removed prior to detection by matched filtering. In addition, the watermark is usually inserted into the N largest spectral coefficients, the ranking of which is not preserved after watermarking. This method does not allow software and hardware devices to directly read embedded signals without access to the original unwatermarked material.

In an article by Cox et al., entitled "Secured Spectrum Watermarking for Multimedia" available at http://www.neci.nj.nec.con/tr/index.html (Technical Report No. 95-10) spread spectrum watermarking is described which embeds a pseudo-random noise sequence into the digital data for watermarking purposes.

The above prior art watermark extraction methodology requires the original image spectrum be subtracted from the watermark image spectrum. This restricts the use of the method when there is no original image or original image spectrum available to the decoder. One application where this presents a significant difficulty is for third party device providers desiring to read embedded information for operation or denying operation of such a device.

In U.S. Pat. No. 5,319,735 by R. D. Preuss et al entitled "Embedded Signaling" digital information is encoded to produce a sequence of code symbols. The sequence of code symbols is embedded in an audio signal by generating a corresponding sequence of spread spectrum code signals representing the sequence of code symbols. The frequency components of the code signal being essentially confined to a preselected signaling band lying within the bandwidth of the audio signal and successive segments of the code signal corresponds to successive code symbols in the sequence. The audio signal is continuously frequency analyzed over a frequency band encompassing the signaling band and the code signal is dynamically filtered as a function of the analysis to provide a modified code signal with frequency component levels which are, at each time instant, essentially a preselected proportion of the levels of the audio signal frequency components in corresponding frequency ranges. The modified code signal and the audio signal are combined to provide a composite audio signal in which the digital information is embedded. This component audio signal is then recorded on a recording medium or is otherwise subjected to a transmission channel. Two key elements of this process are the spectral shaping and spectral equalization that occur at the insertion and extraction stages, respectively, thereby allowing the embedded signal to be extracted without access to the unwatermarked original data.

In U.S. patent application Ser. No. 08/708,331, filed Sep. 4, 1996, entitled "A Spread Spectrum Watermark for Embedded Signaling" by Cox, and incorporated herein by reference, there is described a method for extracting a watermark of embedded data from watermarked images or video without using an original or unwatermarked version of the data.

This method of watermarking an image or image data for embedded signaling requires that the DCT (discrete cosine transform) and its inverse of the entire image be computed. There are fast algorithms for computing the DCT in N log N time, where N is the number of pixels in the image. However, for N=512×512, the computational requirement is still high, particularly if the encoding and extracting processes must occur at video rates, i.e. 30 frames per second. This method requires approximately 30 times the computation needed for MPEG-II decompression.

One possible way to achieve real-time video watermarking is to only watermark every Nth frame. However, content owners wish to protect each and every video frame. Moreover, if it is known which frames contain embedded signals, it is simple to remove those frames with no noticeable degradation in the video signal.

An alternative option is to insert the watermark into n×n blocks of the image (subimages) where n<<N. If the block size is chosen to be 8×8, i.e. the same size as that used for MPEG image compression, then it is possible to tightly couple the watermark insertion and extraction procedures to those of the MPEG compression and decompression algorithms. Considerable computational saving can then be achieved since the most expensive computations relate to the calculation of the DCT and its inverse and these steps are already computed as part of the compression and decompression algorithm. The incremental cost of watermarking is then very small, typically less than five percent of the computational requirements associated with MPEG.

U.S. patent application Ser. No. 08/715,953, filed Sep. 19, 1996, entitled "Watermarking of Image Data Using MPEG/JPEG Coefficients" which is incorporated herein by reference, advances this work by using MPEG/JPEG coefficients to encode the image data.

U.S. patent application Ser. No. 08/746,022, filed Nov. 5, 1996, entitled "Digital Watermarking", which is incorporated herein by references, describes storing watermark information into subimages and extracting watermark information from subimages.

A review of watermarking is found in an article by Cox et al., entitled "A review of watermarking and the importance of perceptual modeling" in Proc. of EI'97, vol. 30–16, Feb. 9–14, 1997.

There have been several proposals to watermark MPEG video or JPEG compressed still images. In all cases, each 8×8 DCT block is modified to contain the watermark or a portion thereof. Consequently, decoding of the watermark requires that each 8×8 block be individually analyzed to extract the watermark signal contained therein. The individual extracted signals may then be combined to form a composite watermark, which is then compared with known watermarks. Because each block must be analyzed individually, an uncompressed image must be converted back to the block-based DCT representation, which is computationally expensive. Thus, while the decoder may be computationally efficient in the DCT domain, extracting a watermark from the spatial domain is much more expensive.

To allow for computationally efficient detection of the watermark in both the spatial and DCT domains, a watermark may be inserted in the sum of all the 8×8 blocks in the DCT domain, or the sum of a subset of all the 8×8 blocks in the DCT domain. A major advantage of this approach is that if the image is only available in the spatial domain, then the summation can also be performed in the spatial domain to compute a small set of summed 8×8 blocks and only those blocks must then be transformed into the DCT domain. This is because the sum of the DCT blocks is equal to the DCT of the sum of the intensities. Thus, the computational cost of decoding in the DCT and spatial domains is approximately the same.

A second advantage of watermarking the sum of the DCT blocks is that there are an unlimited number of equivalent methods to apportion the watermark throughout the image. For example, if the watermark requires a change of $\Delta i$ to the i'th coefficient of the summed DCT block, then, if there are M blocks in the image, $\Delta i/M$ can be added to each individual block, or block 1 can have $\Delta i$ added to it and the remaining M-1 blocks left unaltered, ignoring for the moment issues of image fidelity. Because of this one to many mapping, it is possible to alter the insertion algorithm without changing the decoder. This is a very important characteristic, since in some watermarking applications, there may be many hardware decoders that are deployed, such that changing the decoder is impractical. However, improvements to the insertion algorithm can still result in improved detection using the approach described herein.

A third advantage of watermarking the sum of the DCT blocks is that watermark signals extracted from these sums have small variances, compared with the amount that they may be changed without causing fidelity problems. This means that, in many cases, it is possible to change an image so that the summed DCT blocks perfectly match the required watermark signal, even though the resulting image appears identical to the original.

Finally, it is well known that some problems, such as modeling the human visual system, are best performed in the frequency domain, where other problems such as geometric transformations are more conveniently dealt with in the spatial domain. Since the computational cost of decoding the watermark is now symmetric, it is possible to switch from spatial to frequency domains at will in order to correct for various signal transformations that may corrupt the watermark.

SUMMARY OF THE INVENTION

The present invention concerns a novel insertion method which employs a specific model of the human visual system which provides much better control over image fidelity. Tests have shown that it is possible to obtain large signals (more than 15 standard deviations from 0 correlation) with images that are indistinguishable from their respective original images.

The method handles robustness against various types of attacks in ways that are easy to relate to the specific type of attack.

The method is adaptable so that the model of the human visual system and the techniques used for handling attacks can be changed later without having to change the detector. The result is that it is possible to continue improving watermarking, particularly DVD (digital video disk) watermarking, even after many detectors have been installed. This is analogous to the situation with MPEG video for which encoder technology can be improved without having to change existing decoders.

Use of the present insertion method allows a simple detection algorithm in either MPEG or decompressed domains.

The invention also concerns a novel detection method which is easy to implement, easy to analyze and has a low computational cost, whether the incoming video is MPEG compressed or uncompressed.

The present invention also concerns a novel insertion method that hides multiple patterns in the data. These patterns fall into two categories: 1) registration patterns used during detection to compensate for translational shifts, and 2) watermark patterns that encode the information content of the watermark.

A principal object of the present invention is the provision of a digital watermark insertion method which allows detection of watermarks after the watermarked data is subjected to predefined scale changes, without modification to the watermark detector.

Another object of the invention is the provision of a watermark detection method that is computationally inexpensive in either the MPEG or decompressed domains.

A still other object of the invention is the provision of a digital watermarking method that withstands attacks without having to change a detector.

Further and still other objects of the invention will become more clearly apparent when the following description is read in conjunction with the accompanying drawings.

DETAILED DESCRIPTION

Figure 1:
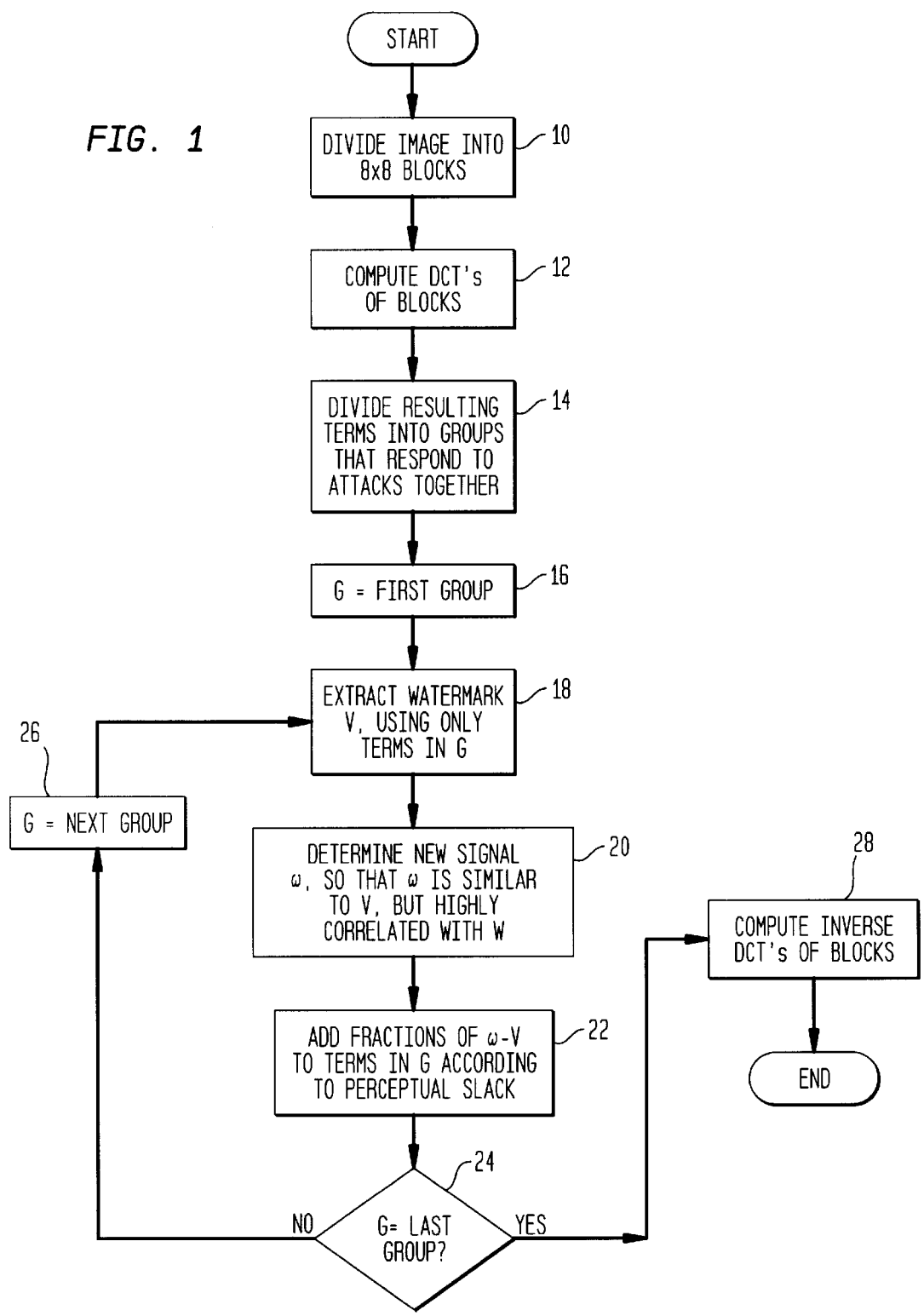
FIG. 1 is a general data flow diagram of a method of inserting a watermark into media data.

As used in the following description the terms image and image data will be understood to be equally applicable to video, image and multimedia data. The term "watermark" will be understood to include embedded data, symbols, images, instructions or any other identifying information.

In order to better understand the present invention, first a review of the basic watermarking method will be presented followed by additional descriptions of the improvements comprising the present invention.

First, we define some notations. Let a watermark to be embedded into an image be an N dimensional vector, denoted by $W[1, \ldots, N]$. In the following text, the notation $W[1, \ldots, N]$ is used in the same manner as $W[k]$ ($k=1, \ldots, N$). Let $V[1, \ldots, N]$ denote a vector value extracted from an image, where the element $V[k]$ corresponds to $W[k]$. Specifically, the value $V[k]$ is a weighted sum of DCT coefficients given by $$V[k] = D\_k[1]F\_k[1] + D\_k[2]F\_k[2] + \ldots + D\_k[n\_k]F\_k[n\_k],$$

where $D\_k[i]$ ($i=1, \ldots, n\_k$) indicate members of the set of DCT coefficients used for calculating $V[k]$, $n\_k$ indicates the number of members, and $F\_k[i]$ ($i=1, \ldots, n\_k$) are weighting coefficients related to a filter processing. The concept of $F\_k$ is that the DCT coefficients are weighted according to how much noise might be expected in each coefficient. To calculate $V[1, \ldots, N]$, n×n DCT coefficients are first calculated over a whole image. Then the coefficients are classified into N sets, each of which is related to each element of $V[1, \ldots, N]$. The rule of classifying DCT coefficients is predetermined, and the same rule is used in both inserting and detecting a watermark.

Before inserting a watermark into an image, a detection algorithm is applied to the image to find a watermark that is already present in the image. If the image does not contain a watermark, the extracted values, $V[1, \ldots, N]$ will be normally distributed random numbers that do not correlate any watemrark $W[1, \ldots, N]$. A watermark $W[1, \ldots, N]$ is inserted into an image by changing each of $D\_k[1, \ldots, n\_k]$ ($k-1, \ldots, N$) slightly in order to make the extracted value $V[1, \ldots, N]$ highly correlate the watermark $W[1, \ldots, N]$. Let the target value of $V[1, \ldots, N]$ be denoted by $\omega[1, \ldots, N]$, that is, the values $V[1, \ldots, N]$ are changed to $\omega[1, \ldots, N]$ by inserting the watermark $W[1, \ldots, N]$. The target values $\omega[1, \ldots, N]$ have high correlation with the watermark $W[1, \ldots, N]$ and they are determined as will be described below.

After the target values $\omega[1, \ldots, N]$ are determined, the difference $\omega[k] - V[k]$ is distributed among the DCT coefficients $D\_k[1, \ldots, n\_k]$. Then a watermark is inserted by adding the allocated difference value to the corresponding DCT coefficients $D\_k[1, \ldots, n-k]$. This change of DCT coefficients must be done in such a manner so as not to change the appearance of the image.

In distributing the difference $\omega[k] - V[k]$, a characteristic of the human visual process is taken into account. The amount of change that does not cause a visible change in the image is different for each DCT coefficient $D\_k[i]$. This amount depends on the human visual process which can be approximately simulated with a computational model. The amount of change is referred to as "slack". The slack is calculated for each DCT coefficient and it is used in distributing the difference $\omega[k] - V[k]$ among the DCT coefficients. Next we describe how to calculate the values of the slack using a model of the human visual process.

The preferred computational model of human visual sensitivity that is used in the present invention is found in an article by Andrew B. Watson, entitled "DCT Quantization Matrices Usually Optimized for Indirect Images" in SPIE, vol. 1913 (1993), pp. 202–216. This model was applied to watermarking in an article by Christine I. Podilchuk and Wenjun Zeng entitled "Digital Image Watermarking Using Visual Models", Proc. of EI'97, vol. 3016, Feb. 9–14, 1997. The current invention differs from that of Podilchuk and Zeng in (i) not requiring the original unwatermarked image at the decoder and (ii) not extracting the watermark from the individual 8×8 blocks, but from the sum of a set of 8×8 blocks. Other computational models are also usable.

For each element of the image's block DCT, $d[i,j]$, this model computes a value called the element's "slack", $S[i,j]$, which indicates how much a particular $d[i,j]$ value may be altered before such an alteration becomes visible. The value is computed in three steps. The first step models the contrast masking phenomenon of the human visual system and models the visual sensitivity at different frequencies and handles the difference between visual sensitivity to changes in different frequencies. The second step models the luminance masking phenomenon of the human visual system and handles the fact that the visual system is more sensitive to changes in dark regions than to changes in bright regions. The third step handles the fact that the sensitivity to changes depends in part on the percentage that the frequency is changing (i.e. a DCT term with a small value in it may only change a little, while one with a larger value may change more).

The perceptual model makes use of a matrix of values that indicate the relative sensitivity of the human visual system to the different terms of a spatial 8×8 DCT. The formulae for computing this matrix are available in an article by Albert J. Ahumada Jr. and Heidi A. Peterson entitled "Luminance-Model-Based DCT Quantization for Color Image Compression", in SPIE, vol. 1666, (1992) pp. 365–374.

After computing the slacks for all the 8×8 DCT's in the image, a slack can be assigned to each $D\_k[1, \ldots, n\_k]$. Call these slacks $S\_k[1, \ldots, n\_k]$. It is now possible to distribute the changes in the V's over all the D\_k's with minimal visual impact. This is done according to the following formula:

$$D'\_k[i] = D\_k[i] + \frac{(\omega[k] - V[k]) * S\_k[i]}{\sum_{j=1}^{n\_k} S\_k[j]F\_k[j]}$$

where D'_k[1, . . . , n_k] are the modified 8×8 DCT coefficients, and ω[k] and V[k] are the k'th elements of ω and V, respectively. The effect of this formula is to distribute the desired change in a given element of the watermark vector (ω[k]–V[k]) over all the DCT coefficients that are summed to produce that element, proportionately according to those DCT coefficients' slacks. To illustrate, consider two simple examples: 1) If all the slacks are 0 except for slack S_k[m], then the sum of all the values S_k[j]F_k[j] is equal to S_k[m]F_k[m], and only D_k[m] is changed. It is changed by the full value of (ω[k]–V[k]). 2) If all the slacks are equal and all the coefficients F_k[i]=1, then each D_k[i] is changed by the same amount.

After making these changes, convert all the 8×8 DCT's back into the spatial domain, and the result is a watermarked image. It is easy to show that the sum of all the D_k's for a given k will equal ω[k]. The process of making this is referred to as "inserting Omega into the image". The watermark extracted from the resulting image, if the image has not been attacked, will be exactly ω, not ω plus noise.

There are two important issues remaining to be discussed. First, how to decide on ω, and, second, how to make the watermark robust.

Previously, the equivalent of ω was computed as:

$$\omega = V + \alpha * W$$

where α is a small constant, and W is a zero-mean watermark signal. It is possible to use the same formula here, but it is too limiting to result in the strongest possible watermark using the present invention. In practicing the invention, it is often possible to insert an ω that has perfect correlation with the watermark, W, without causing any visible change in the image. The following formula is used:

$$\omega = mean(V) + \beta * (V - mean(V)) + \alpha * W$$

This result is a weighted sum of the watermark signal and the original, noise (image) signal. If β is set to 0, the result is an ω that perfectly correlates with W.

The signal to noise ratio for an unattacked image will be:

$$SNR = \alpha * std(W) / \beta * std(V)$$

where std(X) is the standard deviation of X.

There are many ways to choose α and β based on optimizations to maximize different criteria such as fidelity or robustness.

At this point there is a complete method of inserting watermarks. The method contains explicit modeling of human vision, but it does not contain any explicit method of making the watermark robust. In fact, the method as described so far will try to put as much of the watermark as possible into the high frequencies since these frequencies have the largest slack, but this is a poor thing to do from the point of view of robustness.

To make the watermark robust against a given set of attacks or signal degradations, it is first necessary to consider how those attacks affect the various terms of the 8×8 DCT's in the image. Then, terms that are affected by attacks or signal degradations in similar ways are grouped together, and watermarked as if the group of terms were a separate image.

The following is a simple example. Suppose there is only concern about two possible attacks: cropping 24 columns of pixels from the left side of the image, or cropping 24 columns of pixels from the right side of the image. This results in three groups of DCT terms: those that come from the 3 left-most columns of 8×8 DCT's blocks, those that come from the 3 right-most columns, and those that come from the rest of the image. All the terms in each of these groups either survives or is destroyed by any given attack together. If each group is watermarked as though it were a separate image, then the watermark from at least one group will generally survive attack (assuming that the 24-column cropping attacks are the only attacks possible), and the watermark that is extracted will consist of the correct watermark, from that group, plus some noisy watermarks from groups that were damaged by the attack.

A more interesting example is low-pass and high-pass filtering attacks. It is possible to group all the low frequencies together into one group, and all the high frequencies into one or more other groups. If the predetermined rule for classifying DCT coefficients into the N sets is designed in such a way that each set has coefficients of many different frequencies, then the complete watermark can be inserted into each group. Then, if the high frequencies are removed, the watermark will still be detectable in the low frequencies, and vice-versa.

The more groups the terms are divided into, the more robust will be the watermark. There is a cost because it will become increasingly more difficult to distribute the changes without causing visible distortion.

It is important to note that the best balance can be achieved after the detectors are in wide use. It is possible to modify the insertion algorithm to make watermarks robust against a wide variety of attacks without having to change detection at all.

Presently only three groups are used. One group collects together most of the low frequencies. Each of the other two groups represents one higher frequency.

In the preferred method, a watermark is not placed in any of the higher frequencies. The reason is not that they are susceptible to attack (that is handled by the design of the Filter [ ] used in detection). Rather, it is because watermarking the higher frequencies causes MPEG compression rates to go down substantially. An alternative solution might be to add other groups that contain higher frequencies.

In FIG. 1, there is shown a flow diagram of the watermark insertion method. The digital image is divided into a collection of n×n blocks, preferably 8×8 blocks, in step 10. The discrete cosine transform (DCT) of each block is computed in a known manner in step 12. The DCT's are separated into groups that respond to different attacks in the same manner 14. A first group G is selected in step 16.

Next, extract a watermark V, using only the terms in the group G in step 18. Determine a new signal (target value) ω selected such that ω is similar to V but is highly correlated with watermark W in step 20.

Add fractions of ω–V to terms in G according to perceptual slack in step 22. Decide whether group G is the last group in step 24. If not, select next group G in step 26, and extract watermark V using only terms of next group G in step 18 and continue procedures until the last group G is found in step 24. Next, compute the inverse DCTs of the blocks in step 28 resulting in a watermarked image.

Some alternative steps in the insertion method are possible. For example, the distribution of the difference between ω and V over DCT terms can be done stochastically to help deter tampering and reduce susceptibility to tampering.

Also, the groups of DCT terms for robustness purposes could be performed dynamically. For example, the insertion program could simulate various attacks on the image and determine the effect on the values of the DCT term. Then, the program would cause appropriate allocation of the terms into the groups similarly affected.

The inserter can be designed with a user-interface that allows the user to set two parameters: (1) the maximum perceptual difference between the original image and the watermarked image (J) and (2) the maximum allowable probability of missed detection after any of the predefined set of attacks. The algorithm would then insert watermarks into a large number of images automatically, according to the allowable perceptual change J and checking each one against simulations of the attacks. If an image fails to meet the specified robustness constraint (maximum allowable probability of missed detection), then the user would be notified so that a manual decision can be made to compensate or trade-off image fidelity for robustness.

In addition, the distribution of the difference between ω and V over DCT terms can be modified to explicitly compensate for MPEG quantization. Using the above watermark insertion method there may result a degraded watermark in the watermarked data. In order to enhance the watermark in the watermarked data after MPEG compression several techniques are possible.

Figure 2:
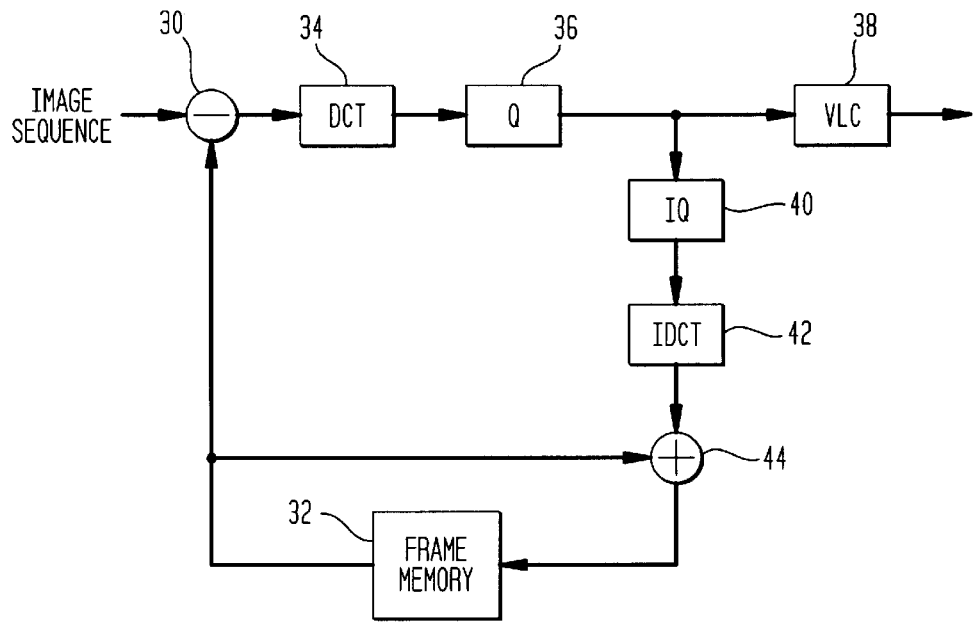
FIG. 2 is a schematic diagram of an MPEG-2 encoder.

FIG. 2 is a schematic diagram of a typical MPEG-2 encoder. FIG. 2 depicts elements which are indispensable to execute an MPEG-2 encoding of P pictures, or to perform a combined interframe prediction and DCT coding. Input images are provided as one input to subtractor 30. The other input to subtractor 30 is predicted image generated in frame memory 32. The predicted images are subtracted from the input images at subtractor 30. A discrete cosine transform (DCT) is performed at DCT calculator 34 on the output signal from subtractor 30. The DCT coefficients are quantized in quantizer 36. The outputs of the quantizer 36 are sent to a variable length encoder 38 where Huffman encoding is performed. The quantized DCT coefficients outputted from the quantizer 36 are also sent to an inverse quantizer 40 where they are de-quantized. Inverse DCT of the de-quantized DCT coefficients is performed in the inverse DCT calculator 42. The results are added at adder 44 to the predicted image outputted from the frame memory 32, and then an image which is expected to be the same as that acquired in a decoder is reconstructed. The reconstructed image is called "a locally decoded image." This locally decoded image is stored in the frame memory 32 to produce the predicted images.

Figure 3:
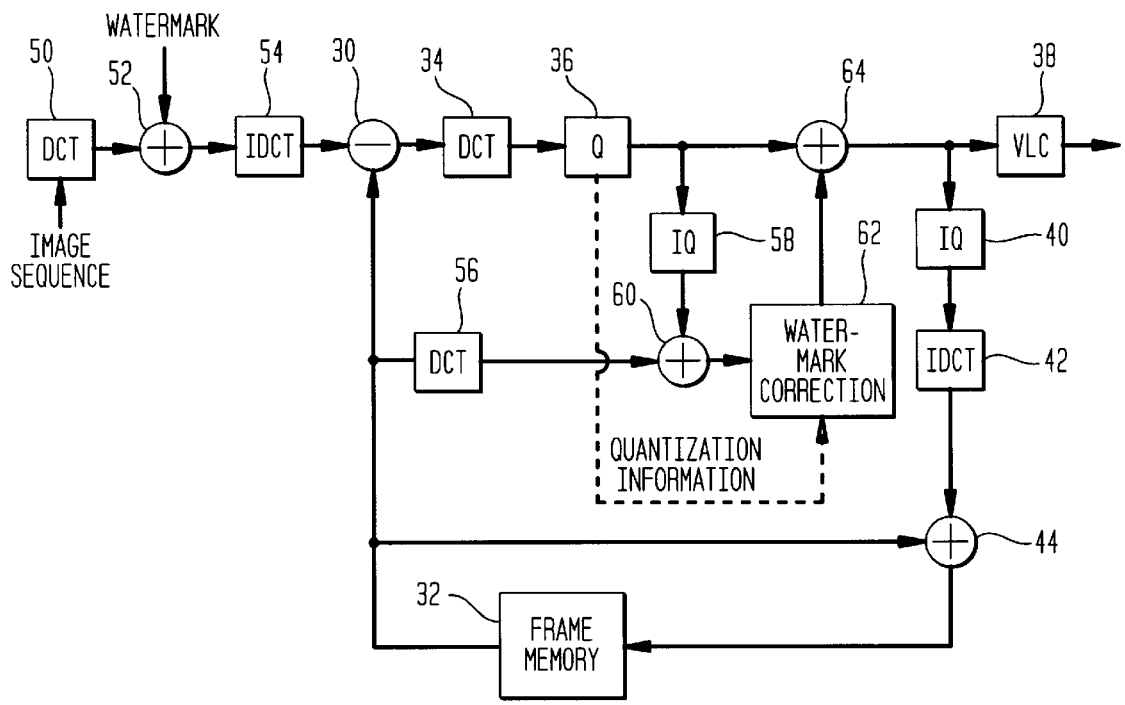
FIG. 3 is a schematic diagram of a modified MPEG-2 encoder for reducing degradation of a watermark in watermarked data.

FIG. 3 is a schematic diagram of a modified MPEG-2 encoder for reducing degradation of a watermark in watermarked data. Before MPEG-2 encoding, DCT is performed on a input image at the DCT calculator 50 and watermark signals are added to the DCT coefficients at adder 52. The output DCT coefficients including watermark information is subject to inverse DCT in the inverse DCT calculator 54. The output of inverse DCT calculator 54 are images with a watermark. These watermarked images are sent to MPEG-2 encoder and MPEG-2 encoding is performed as described above. In addition, in this embodiment, watermark information is modified in order to be suited to MPEG-2 compression. DCT coefficients for the predicted images are calculated in DCT calculator 56. The quanitization values outputted from quantizer 36 are de-quantized in inverse quantizer 58. The results of inverse quanitization are added at adder 60 to the DCT coefficients outputted from DCT calculator 56. The results of addition correspond to the DCT coefficients for the decoded images which are expected to be generated in a decoder. These DCT coefficients are inputted into a watermark correction device 62. The watermark correction device 62 outputs watermark correction signals. At adder 64, the watermark correction signals from device 62 are added to the quantization values from quantizer 36. The output of adder 64 is used as the inputs to variable length encoder 38 and inverse quantizer 40.

Figure 5:
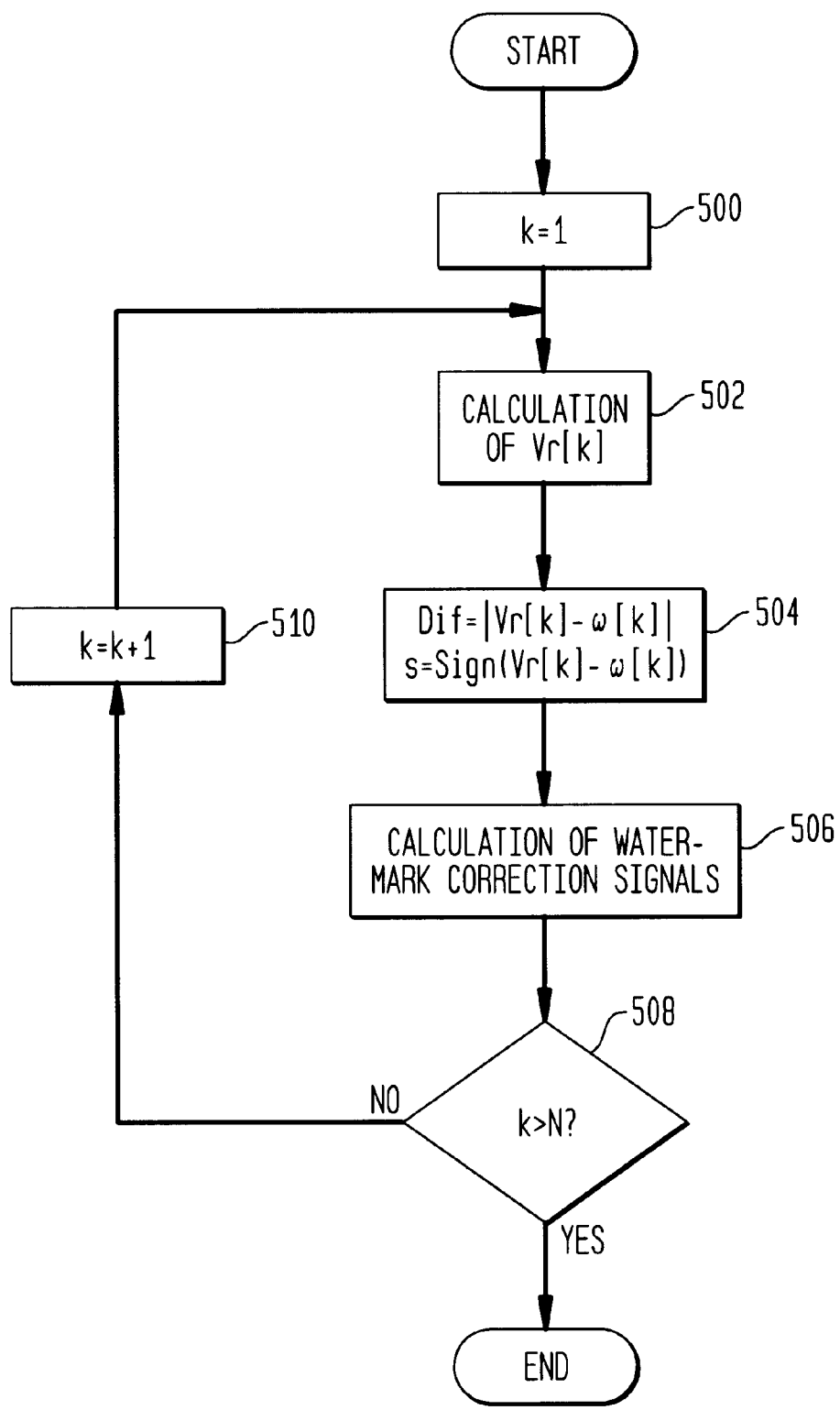
FIG. 5 is a flow chart of the process performed in the watermark correction device in FIGS. 3 and 4.

Next, we describe the process performed in the watermark correction device 62. Let us introduce several new notations to explain the process. Let $Dq\_k[i]$ be the quantization value corresponding to $D\_k[i]$, that is, the quantization value of the i-th member of the k-th set for calculating the value V. Let $Q\_k[i]$ be the quantization step size used in obtaining $Dq\_k[i]$. Let $Dr\_k[i]$ be the output value of adder 60 that is obtained by adding the inverse quantization value of $Dq\_k[i]$ calculated in inverse quantizer 58 to the corresponding DCT coefficient outputted from DCT calculator 56. Let $Vr[1, \ldots, N]$ be the value extracted from the output values of adder 60, $Dr\_k[i]$, in the same manner that the value $V[1, \ldots, N]$ is calculated in inserting a watermark. We assume that the target value $\omega[1, \ldots, N]$ is also available in the watermark correction device 62. FIG. 5 shows that the flow chart describing the process performed in the watermark correction device 62. First the index k of the watermark element is set to 1(Step 500). Next the value $Vr[k]$ is calculated (Step 502) by $$Vr[k]=F\_k[1]Dr\_k[1]+\ldots F\_k[n\_k]Dr\_k[n\_k],$$

where the weighting coefficients $F\_k[1, \ldots, n\_k]$ are the same value as those used in calculating $V[k]$. Then the absolute value of the difference between the value $Vr[k]$ and the target value $\omega[k]$, and the sign of the difference are computed in step 504 by the following equations:

$$Dif=|Vr[k]-\omega[k]|$$

$$s=SIGN(Vr[k]-\omega[k]),$$

where $$\text{Sign}(x) = \begin{cases} 1 & (x \geq 0) \\ -1 & (x < 0) \end{cases}$$

This value Dif corresponds to the distortion of the watermark inserted at the adder 52 generated in the quantization process.

On the basis of the absolute value Dif and the sign s watermark correction signals are generated in step 506. The process in Step 506 is described below. After calculating the watermark correction signals for the DCT coefficients related to the k-th element of the watermark, index k is compared with N in step 508. If k>N. then the process is finished. If k≦N, the value k is increased by one in step 510, and the process goes back to step 502. The watermark correction process is thus performed, and the obtained watermark correction signals are finally outputted to adder 64.

Figure 6:
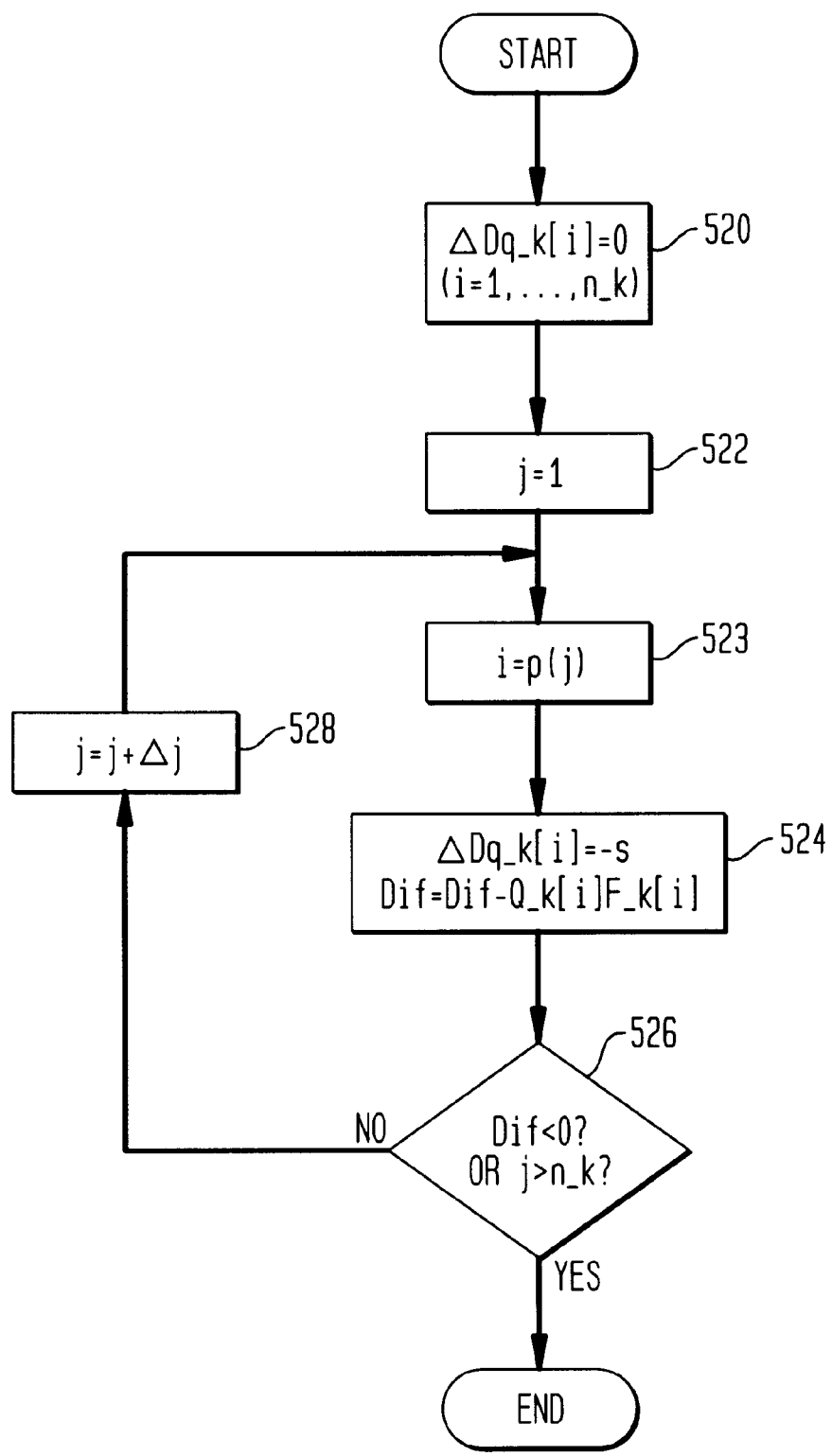
FIG. 6 is a flow chart of the process performed in step 506 of FIG. 5.

Next, we describe the process performed in step 506 in FIG. 5, using the flow chart in FIG. 6. In step 506, the watermark correction signals for the DCT related to the k-th element of the watermark are generated. The array $\Delta Dq\_k[i](i=1, \ldots n\_k)$ are first all set to zero in step 520. Next, the value j is set to one in step 522. Then the index of the DCT coefficients i is found through a permuting function p(j) in step 523. The function p(j) returns the j-th value of a permutation obtained after the integers 1 to n_k are permuted. The simplest example is p(j)=j. Next, a value −s is stored in $\Delta Dq\_k[i]$, and the value Dif is decreased by $Q\_k[i]F\_k[i]$ in step 524. This indicates that the quantization value $Dq\_k[i]$ is changed by −s by adding $\Delta Dq\_k[i]$ to $Dq\_k[i]$ at adder 64. The value s is 1 or −1, so the change in the quantization value is one. In other words, de-quantized value obtained in a inverse quantizer in a decoder is changed by $-Q\_k[i]$, one step size. The value Dif after the update is identical to the absolute value of the difference between $\omega[k]$ and $Vr[k]$ calculated with the corrected quantization values $Dq\_k[i]+\Delta Dq\_k[i](i=1, \ldots n\_k)$. After step 524, the values Dif and zero, and index j and $n\_k$ are compared in step 526. If Dif<0 or $j>n\_k$, then this subroutine is finished. If the condition is not satisfied, the index j is increased by certain amount $\Delta j$ in step 528, then the process returns to step 523.

Figure 7:
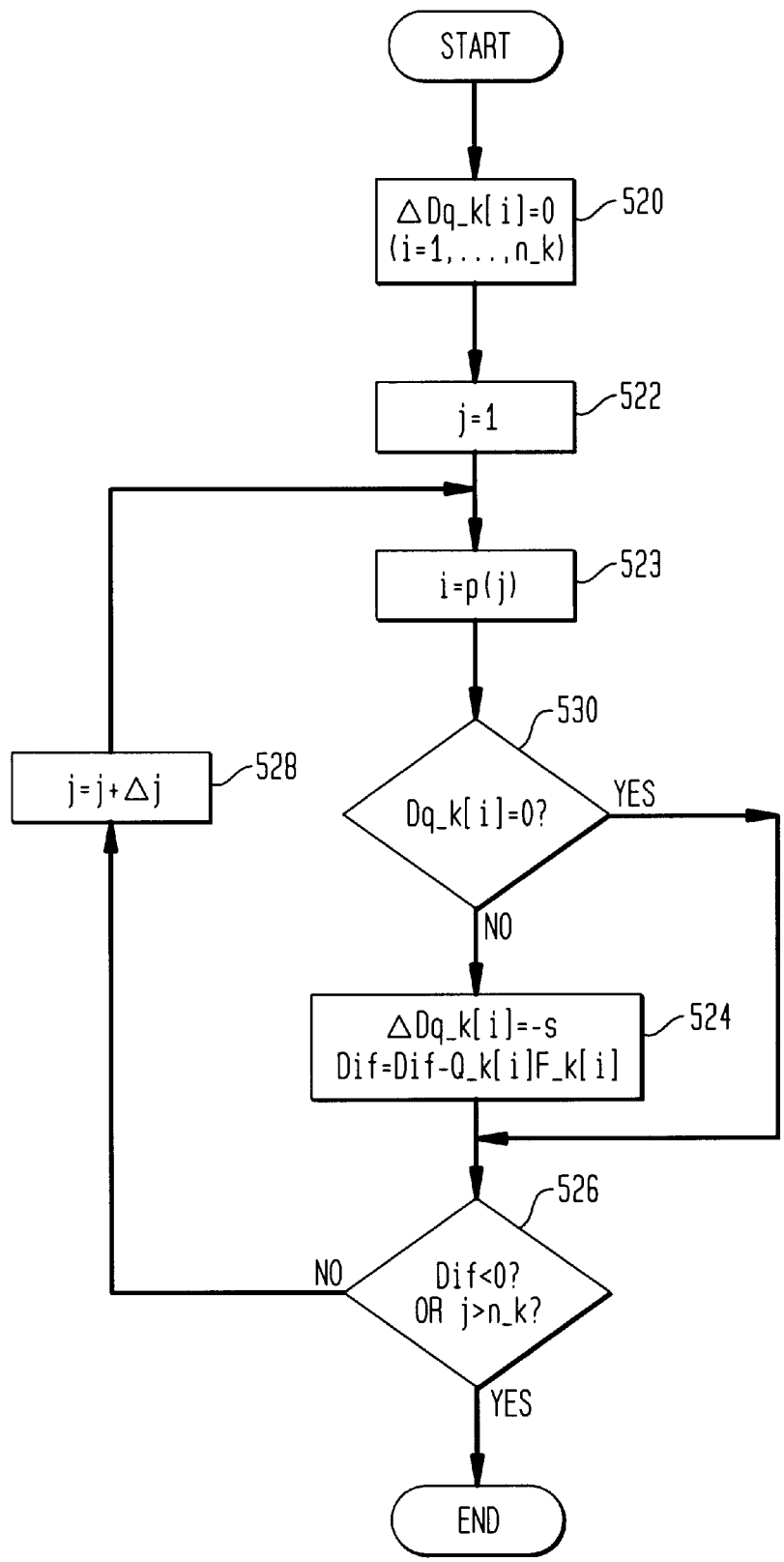
FIG. 7 is a flow chart of an alternative process performed in step 506 of FIG. 5.

Instead of the process shown in FIG. 6, an alternative process shown in FIG. 7 can be used as the process of step 506. In the process shown in FIG. 7, a step 530, checking whether the quantization value $Dq\_k[i]$ equals zero or not, is added between step 523 and step 524. In this case, step 524 is performed only if the quantization value $Dq\_k[i]$ is a non-zero value. This allows a reduction in the increase of the number of bits caused by correcting watermark information, because changing a quantization value from zero to non-zero value generally results in a large increase in the number of bits.

Figure 4:
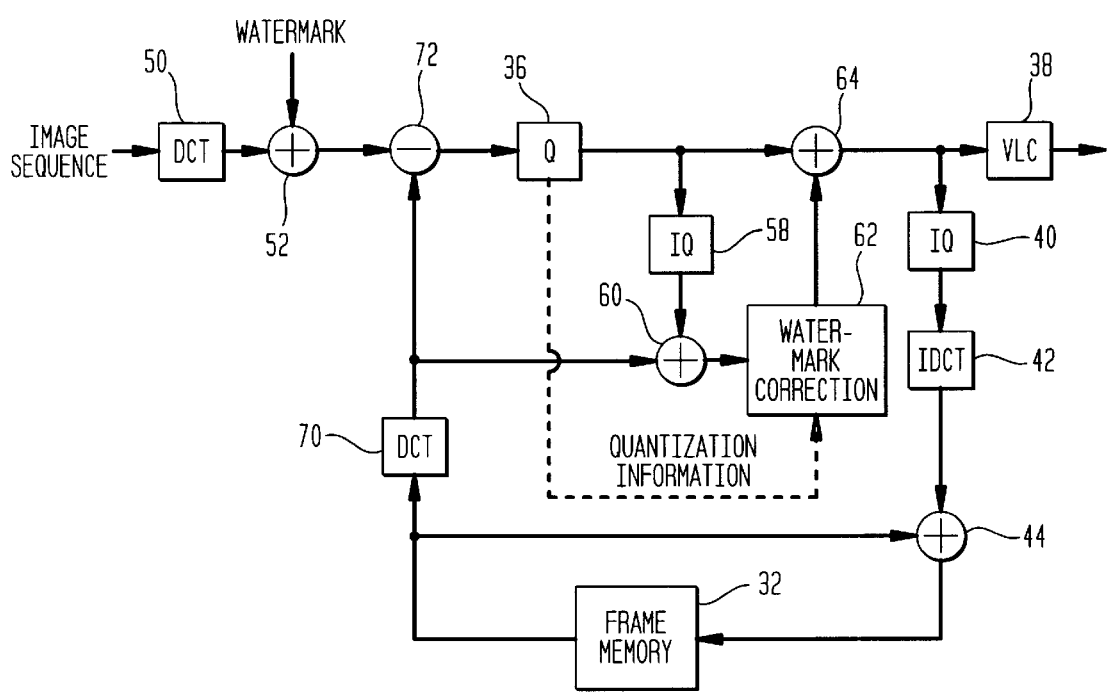
FIG. 4 is a schematic diagram of an alternative modified MPEG-2 encoder for reducing degradation of a watermark in watermarked data.

FIG. 4 is a schematic diagram of an alternative embodiment of a modified MPEG-2 encoder for reducing degradation of a watermark in watermarked data. In this embodiment, the basic concept is the same as the described in connection with FIG. 3. The differences lie in the fact that subtraction of the predicted images from the input original images is performed in the DCT domain not in the spatial domain. For the predicted image outputted from the frame memory 32, DCT is performed in DCT calculator 70, and the results are subtracted from the watermarked DCT coefficients at subtractor 72. The results of subtraction are sent to the quantizer 36 and then the watermark correction is performed in the same manner as shown in FIG. 3. The results outputted from subtractor 72 are the same as the results outputted from the DCT calculator 34 in FIG. 3 because of the linearity of DCT. Therefore, the results obtained in the processes followed by quantization in quantizer 36 are the same as those in FIG. 3. This embodiment results in a reduction in the number of DCT calculations.

The detection procedure to detect a watermark in an image will now be described.

If MPEG video is the input image data format, the following detection process determines whether watermark W is present, where $W[1, \ldots, N]$=the watermark being tested for.

Decode the Huffman code, but do not compute the inverse DCT's, so that, for each frame (at least, each I-frame), there is an array of 8×8 DCTs.

Next perform the same summation of DCT coefficients that was performed during watermark insertion to obtain the vector V. Compute the correlation coefficient C, between V and the watermark being tested for, W:

$$V' = V - \overline{V}$$

$$W' = W - \overline{W}$$

-continued $$C = \frac{W' \cdot V'}{\sqrt{(W' \cdot W')(V' \cdot V')}}$$

Finally, convert C into a normalized Fisher Z statistic:

$$Z = \frac{\sqrt{N-3}}{2}\log\frac{1+C}{1-C}$$

where N is the length of the watermark.

The Z value indicates whether the watermark is present. A preferred threshold for Z is 4 (i.e. $Z\geq 4$ means the watermark is present), but other values may be used depending on the desired probabilities of false alarms and missed detections.

Figure 8:
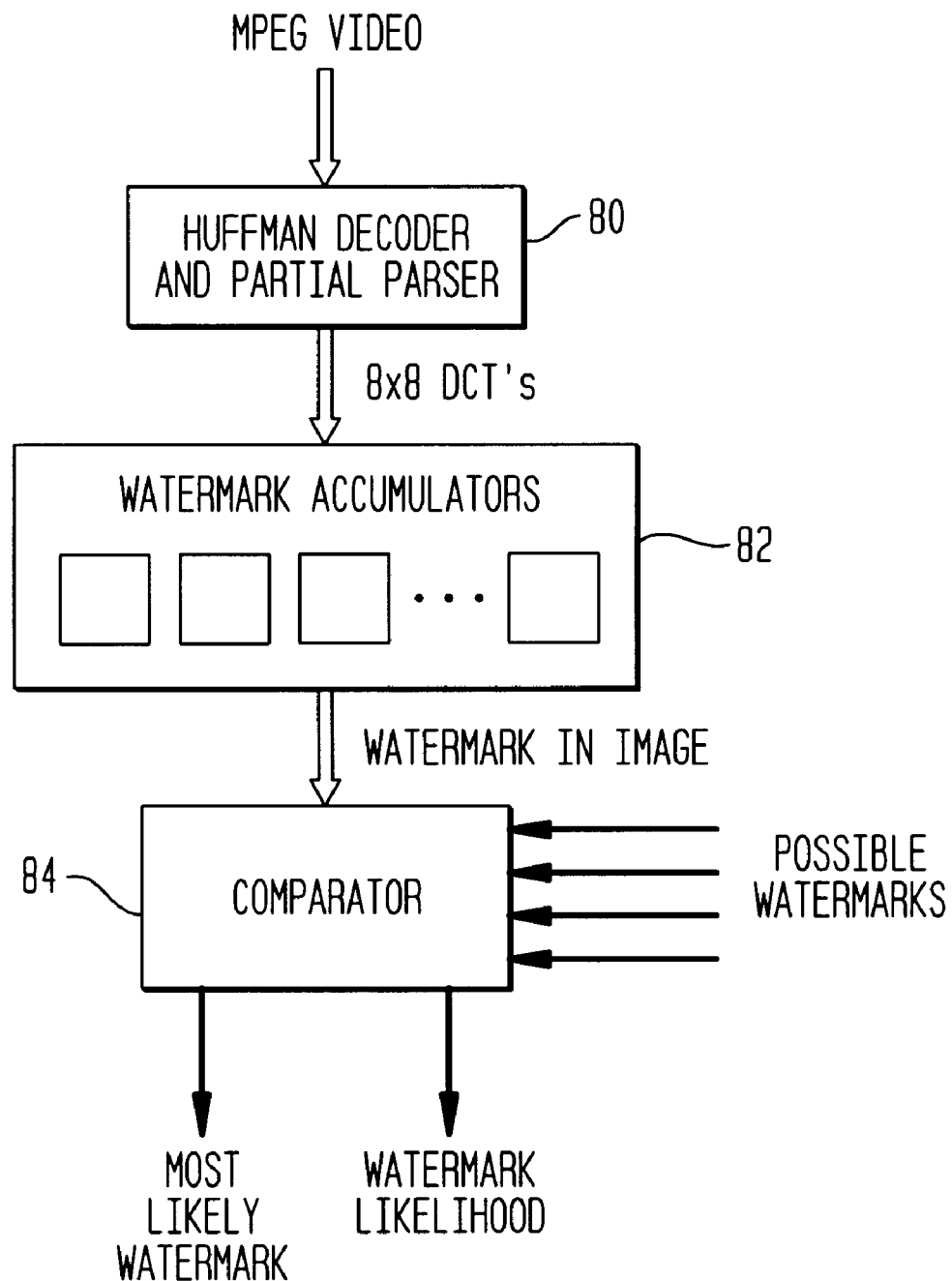
FIG. 8 is a flow diagram of a method of extracting a watermark from MPEG media data.

FIG. 8 is a flow diagram of the detection method for MPEG video input described above. The input MPEG video is subject to a Huffman decoder and partial parser 80 where the output is a set of DCT for n×n, preferably 8×8, blocks of the video input.

The n×n DCTs are provided to watermark accumulator 82. Accumulator 82 has memory whose length is the watermark length N. DCT coefficients from the Huffman decoder and partial parser 80 are classified according to a predetermined rule and summed for extracting a watermark as mentioned before, and the results are accumulated in the memory. The extracted watermark is proved to comparator 84 where it is compared with possible watermarks in the image by calculating correlation coefficients between the extracted watermark and the possible watermarks as mentioned before. The possible watermarks are the universe of the watermarks accumulators and comparator are found, for instance, in U.S. patent application Ser. No. 08/746,022.

The output of comparator 84 is the likelihood (normalized Fisher Z statistic) of the detected watermark being each of the possible watermarks. The most likely watermark is determined and is deemed the watermark in the image, or, if the detector does not exceed a predetermined threshold, then no watermark is present.

Alternatively, if the incoming input data comprises an uncompressed image, an embedded watermark can be detected by applying the method above to DCT coefficients obtained by performing 8×8 DCT for the whole image. In this case, DCT have to be performed for each 8×8 block, but a skillfully designed rule for classifying DCT coefficients into N sets enables us to avoid performing DCT many times. Before explaining the method to reduce DCT calculation, let us define some notations.

Let $h\_m(i, j)$ ($i=1 \ldots 8, j=1, \ldots 8$. $m=0, \ldots, M-1$) be a set of functions that map frequency indices of 8×8 DCT coefficients (i, j) onto the indices k of the element of a watermark, and M indicates the number of functions. So if $k=h\_m(i, j)$, then a DCT coefficient whose index is (i, j) is classified into the k-th set of DCT coefficients for calculating the value V[k]. We prepare M different functions $h\_m(i,j)$ ($m-0, \ldots M-1$). Which function is selected for a certain 8×8 block depends on the numbers r and c of the block where r and c indicate the row and column numbers of the block respectively. So the index of the functions, m, is first found according to the values r and c, then the index of the sets, k, is determined by $h\_m(i,j)$ for each DCT coefficient. Using these functions $h\_m(i,j)$ in classifying DCT coefficients is assumed in the remaining part of the detailed description.

In this case, we can reduce the number of DCT calculations in the following manner. First the sum of the blocks whose indices m are the same is computed for each m=0, . . . , M−1. Let this summed block be denoted by VB_m[i,j](m=0, . . . ,M−1). Then DCT is perfomred for the M summed blocks VB_m[i,j](m=0,. . . , M−1). Finally, the DCT coefficients of the summed blocks are classified into N sets according to the value h_m(i,j), and added together within each set to obtain V[1, . . . ,N]. The obtained results V[1, . . . N] are the same as V[1, . . . N] obtained with the method mentioned above because DCT is a linear transform, that is, the sum of DCT blocks equals the result of DCT for the sum of the blocks. If M is much less than the total number of blocks in an image, the number of DCT calculations is dramatically reduced. This method thus allows us to extract watermarks with small calculation cost.

Figure 9:
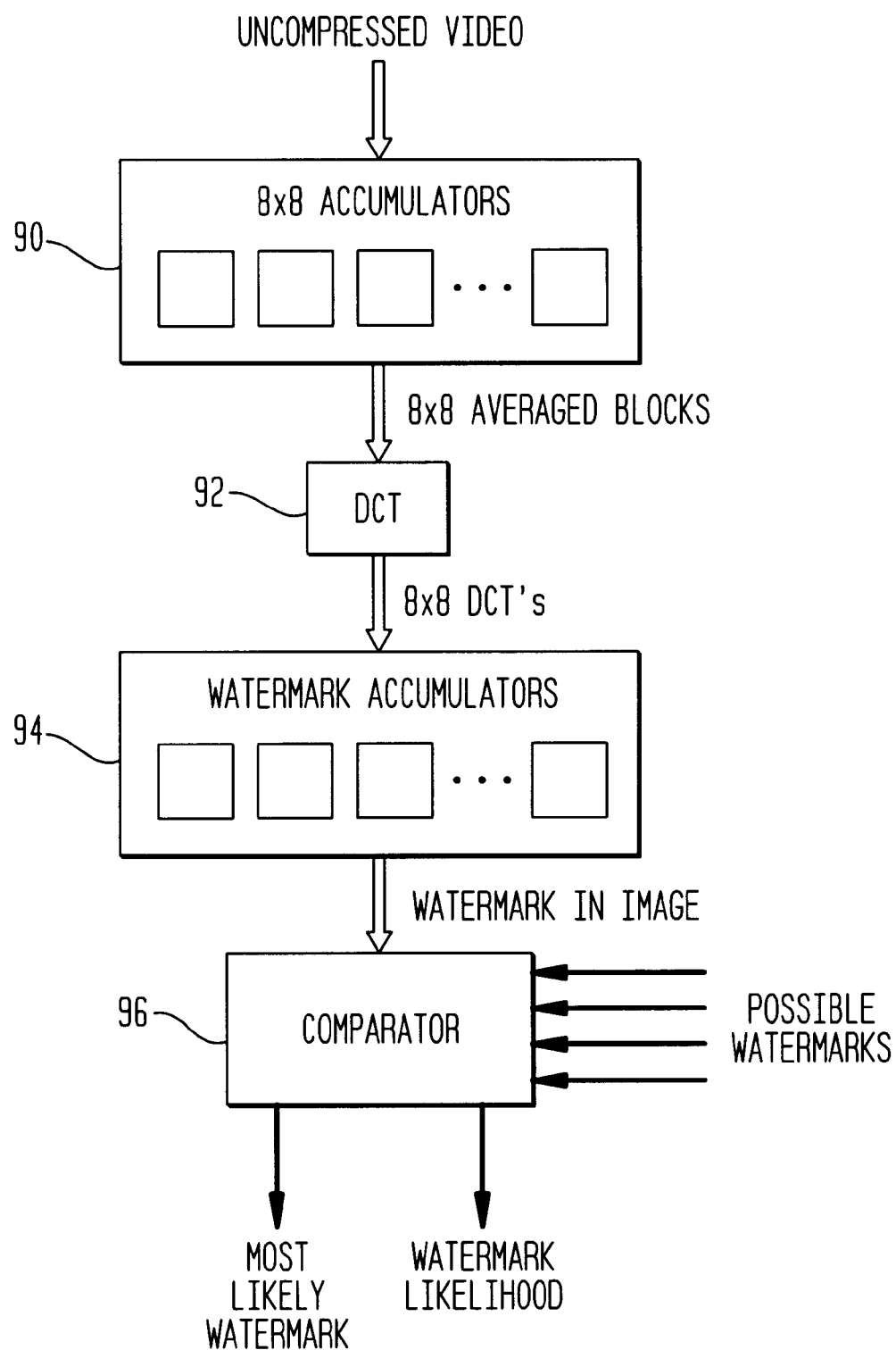
FIG. 9 is a flow diagram of a method of extracting a watermark from uncompressed media.

FIG. 9 shows a flow diagram of the detection method for uncompressed video input data as described above.

The uncompressed video image data is provided to n×n accumulators, preferably 8×8 accumulators 90. The memory requirement is $n^2$ times the number of the function h_m(i,j). For each index m. the blocks with the same index m are summed and the resultant M summed blocks are accumulated in the memory.

The output is the summed signal of each of the n×n blocks. The output is subject to a DCT transform 92. The number of transformations is proportional to the number of the functions h_m(i,j). The result is a group of n×n DCTs which is classified into N sets according to the functions h_m(i,j) and summed for extracting a watermark as mentioned before. The obtained watermark is provided to watermark accumulator 94 and accumulated. The memory requirement for accumulator 94 is proportional to the watermark length. The extracted watermark is provided as input to comparator 96. The other inputs to comparator 96 are the possible watermarks that may have been inserted into the input image data. The comparator computes a likelihood (normalized Fisher Z statistic) of each possible watermark having been inserted into the image data. The most likely watermark is determined and is deemed the watermark in the image.

A limitation of block based DCT methods is their sensitivity to spatial shifts of the image. For example, if the image is shifted two pixels to the right, then the DCT coefficients change significantly, so that the watermark cannot be detected. Furthermore, general distortions, such as scaling and rotation, also make the watermark undetectable.

To solve these problems, the above insertion and extraction methods may be modified in two ways. The first possible modification is to insert multiple watermarks designed to survive predefined distortions of the video. The second modification is to arrange that translations can be compensated for without performing the summation more than once. Optionally, this second modification may be further modified to insert registration patterns, one for each of the multiple watermarks, which can be used by a modified watermark detector to compensate for arbitrary translations of the video.

When detecting watermarks inserted using the above method, it is necessary to divide the image into the same grid of n×n blocks as was used during insertion. If the image has been translated since watermark insertion, then determining the correct grid becomes difficult. In many applications, this is a serious problem, since certain, specific transformations can be expected. For example, it can be expected that video on a DVD disk might be modified to fit on a standard television screen by conversion to either "panscan" or "letterbox" mode. In "panscan" mode, the horizontal image resolution is increased, and the image is cropped at a predetermined offset, so that the resulting image will be correct when viewed on a 3×4-aspect-ratio television screen. In "letterbox" mode, the image is scaled vertically, and black is added at the top and bottom, so that the whole image will fit correctly on a 3×4-aspect-ratio screen. Since these two geometric transformations are more likely than any other, it is reasonable to prepare for them specifically.

The problem of the predetermined scaling or transforming of watermarked video is solved in the present invention by inserting an additional watermark for each of the likely transformations. Each of these watermarks is designed so that, when the image has undergone the corresponding known transformation, the grid of n×n blocks used during insertion will align with a predetermined grid used during detection. Thus, if the image has undergone no transformation, then the detection grid will align with the normal mode watermark, and the normal mode watermark will be detected. If the image has undergone "panscan" transformation, then the same detection grid will align with the "panscan" watermark, and the "panscan" watermark will be detected, and so forth for "letterbox" scan or any other predefined transformation.

The procedure for inserting a watermark that is to be detected after a specific transformation comprises the following steps:

1. Make a copy, $I_T$, of the image being watermarked, I, and apply the transformation to be compensated for the image. For example, $I_T$ might be a copy of I that has been transformed into "letterbox" mode by vertical shrinking of I.
2. Create a watermarked version of the transformed image, $I_T'$, according to the general watermarking method described above.
3. Let $W_T = I_T' - I_T$ be the spatial pattern that was added to $I_T$ when it was watermarked.
4. Perform the inverse transformation on $W_T$ to yield the corresponding watermark pattern, W, for the untransformed image. For example, if the transformation to be compensated for was "letterbox" mode, then W would be obtained by vertically expanding $W_T$.
5. Let I'=I+W be the image with a watermark added for the given transformation.

When the transformation is applied to I', the result will be approximately $I_T'$, and the watermark will be detected by the same procedure designed to detect a normal watermark.

This process can only be used for a small number of transformations, as each additional watermark causes additional degradation of the image, and reduces the detectability of other watermarks in the image. However, tests have shown that three watermarks—two for transformed images and one for the untransformed image—result in acceptable fidelity and good detectability. Alternatively, for video, each watermark can be inserted in a time-multiplexed manner.

In cases where the transformations that an image will undergo are not predefined or predetermined, or where there are too many probable transformations to allow for the insertion of a separate watermark for each transformation, the above described method of compensating for transformations is not optimal. Thus, the present invention includes an additional improvement, which compensates for arbitrary translation of the image between the times of watermark insertion and watermark detection.

Arbitrary translation is compensated for in two ways. One way is by translations by even multiples of 8 pixels in the x or y directions when 8×8 blocks are used. This can be easily compensated for if the following restrictions are imposed on the relationship between an index of h_m(i,j), m, and the row and column numbers of blocks, r and c. We determine the index m according to $$m=f(r,c) \bmod M,$$

where f(r,c) is a linear function of r and c, and f(0,1) and f(1,0) are integers. In addition, let h_m(i,j) be a function expressed as $$h\_m(i,j)=(h\_0(i,j)+a \times m) \bmod N,$$

where a is an integer. These restrictions are assumed in the remaining part of the detailed description. In this case, the shift compensation is performed in the basic detection algorithm by computing the correlation of the extracted watermark with all cyclical shifts of the watermark being tested for. This is because the values VB_m[i,j] (m=0, ..., M−1) obtained from a watermarked image shifted by a multiple of 8 pixels in the horizontal and/or the vertical directions are identical to the values VB_m[i,j](m=0, ..., M−1) obtained from the non-shifted image except that the indices m are cyclically shifted. As a result, the extracted value V[1,...,N] obtained from a watermarked image shifted by a multiple of 8 are identical to the value V[1, ..., N] obtained from the non-shifted image except that the elements V[k] are cyclically shifted. For n×n grid format, the same thing is true of a shift of a multiple of n in the horizontal and/or the vertical directions.

For shifts of less than 8 pixels in x and/or y directions, an exhaustive search can be performed of all 64 possibilities and the maximum Z value taken from the set of 64×M−Z values, where M is the number of 8×8 accumulators. In our tests M was chosen to be 64. The factor M is necessary to account for the cyclic shifts that are introduced by shifts of a multiple of 8 pixels.

The exhaustive search requires shifting the M 8×8 accumulator array in the spatial domain and then performing the DCT of each of the M 8×8 blocks. This is performed 64 times, once for each of the possible shifts. Thus it is necessary to perform 64×M 8×8 DCTs. If this computation is too expensive in terms of time or memory an alternative method can be used, as described below.

The second way, which compensates for translations of non-even multiples of n pixels, uses a pattern (referred to as a "registration pattern") which can be inserted at the time of watermark insertion. By finding the location where the registration signal best matches a predefined signal, a detector can determine how much to shift the data before extracting the watermark. This shifting must be done in the spatial domain, but can be done with accumulators, so conversions of whole images are avoided.

Moreover, the 64×M 8×8 DCTs are unnecessary. Instead, the correct registration is determined in the spatial domain and then compensated for by shifting the pixels in the accumulator arrays. The M 8×8 accumulators are only then transformed into the DCT domain and the watermark extraction is performed as described above.

The registration pattern is an 8×8 spatial pattern inserted into the image in such a way that the sum of all 8×8 pixel blocks highly correlates with the pattern. Again, an n×n spatial pattern is used when the video is n×n blocks. A registration pattern can be inserted by using the watermark insertion method described above. The sum of all 8×8 pixel blocks becomes highly correlated with a registration pattern if the DCT coefficients of the sum block and those of the registration pattern are highly correlated to each other. In addition, the DCT coefficients of the sum block equals the sum of all DCT blocks because of the linearity of DCT. We can thus insert a registration pattern using a method similar to that inserting a watermark described above, considering the DCT coefficients of a registration pattern as a watermark W and considering the sum of all 8×8 DCT blocks as a value V.

Insertion is performed by converting the registration pattern into the DCT domain, and then using the basic insertion algorithm with different $D_k$s and $F_k$s. Specifically, each AC term of the registration pattern's DCT is considered one element of the watermark, W[k]. The set of DCT terms that are summed together to extract this element, $D_k$, is simply the set of corresponding terms of all the 8×8 DCTs in the image. All the $F_k$s are set to 1. Using these $D_k$s and $F_k$s, the insertion algorithm inserts a registration pattern along with each watermark. The watermarks are still inserted with the original $D_k$s and $F_k$s.

During detection, registration is performed as follows. Each of a predetermined number of blocks is summed together to form a single n×n, typically 8×8, block. We have arbitrarily used 64 blocks in our tests. This block contains a registration pattern placed there by the insertion process. To determine the horizontal and vertical translation of the frame, a correlation process is performed in the spatial domain to determine these offsets. Sixty-four correlations are performed for each of the 8 horizontal and 8 vertical motions that are possible. When the 8×8 patch is shifted either horizontally or vertically, a wrap around shift is performed.

We now describe how to determine the shift of the grid. In the following method, we assume the integer values f(0,1) and f(1,0) are relatively prime to M.

First, the blocks for which the same function h_m(i,j) is used in classifying DCT coefficients are added together in the spatial domain for generating a summed block VB_m[i,j] for each m. The sum of all n×n blocks denoted by AB[i,j], is computed by $$AB[i, j] = \sum_{m=0}^{M-1} VB\_m[i, j] \quad (i = 1, \ldots, n, j = 1, \ldots, n).$$

Then the correlation coefficient between AB[i,j] and a registration pattern, denoted by R[i,j] is computed. After calculation of the correlation coefficient, the values AB[i,j] are cyclically shifted by one column in the horizontal direction, and the correlation coefficient between AB[i,j] and R[i,j] is calculated in the same way. The same operations are repeated for each shift. After shifting n times, AB[i,j] becomes identical to AB[i,j] before any shift is done. Then, the values AB[i,j] are cyclically shifted by one row in the vertical direction, and calculation of a correlation coefficient and shift by one column in the horizontal direction are repeated. In this way, we can calculate correlation coefficients for all $n^2$ possible shifts. At the same time, we search the shift value (offset), denoted by (X,Y), which gives the maximum correlation coefficient.

After the offset (X,Y) has been determined, the M summed blocks VB_m[i,j] are then shifted accordingly in the spatial domain. Next, we describe the method to compensate for the shift value X in the horizontal direction. To do so, the values VB_m[i,j](m=0, ... ,M−1) are first copied on an n×nM array VB1[i,j] (i=1, ... ,n,j=1, ... ,nM). copying the values VB_m[i,j], the spatial relationships between blocks, that is, which blocks are adjoining a certain block are considered. The function f(r,c) is linear, so $$f(r,c+1)=f(r,c)+f(0,1).$$

This indicates that the blocks whose index m equals $$m1=(m0+f(0,1)) \bmod M$$

are located next to the blocks in which m=m0. So, the values VB_m1 are copied next to the values VB_m0 in the array VB1. For this reason, for each I (I=0, . . . ,M−1), the values VB_m'[i, j](i=1, . . . ,n,j=1, . . . , n, m'=I×F(0,1)mod M) are copied in the n×n square region of VB1 where the index of the left-top corner is (1, nI+1). After copying the values for all I, the array VB1 is filled with the values VB_m[i,j] because f(0,1) and M are relatively prime. Next, the values in the array VB1 are cyclically shifted by X in the horizontal direction. Then the values in VB1 are returned to VB_m in such a way that the value in the n×n region of VB1 where the index of the left-top corner is (1, nI+1) are substituted to VB_m'[i,j](i=1, . . . ,n, j=1,. . . ,n, m'=I×f(0,1) mod M) for each I(I=0, . . . ,M−1). The horizontal offset value X can thus be compensated for without shifting the whole image itself.

Next, the shift value Y in the vertical direction is compensated for. To do so, the values VB_m[i,j](m=0, . . . , M−1) are first copied on an nM×n array VB2 [i,j] (i=1, . . . , nM, j=1, . . . ,n). In copying the values VB_m[i,j], the spatial relationship between blocks are considered. The function f(r,c) is linear, so $$f(r+1,c)=f(r,c)+f(1,0).$$

This indicates that the blocks whose index m equals $$m1=(m0+f(1,0)) \bmod M$$

locate under the blocks in which m=m0. So, the values VB_m1 are copied under the values VB_m0 in the array VB2. For this reason, for each I(I=0, . . . ,M−1), the values VB_m'[i,j](i=1, . . . ,n, j=1, . . . , n, m'=I×f(0,1) mod M) are copied on the n×n square region of VBI where the index of the left-top corner is (nI+1, 1). After copying the values for all I, the array VB2 is filled with the values VB_m[i,j] because f(1,0) and M are relatively prime. Next, the values in the array VB2 are cyclically shifted by Y in the vertical direction. Then the values in VB2 are returned to VB_m in such a way that the value in the n×n region of VB2 where the index of the left-top corner is (nI+1, 1) are substituted in VB_m'[i,j](i=1, . . . n, j=1, . . . ,n, m'=I×F(0,1) mod M) for each I (I=0,. . . ,M−1). The vertical offset value Y can thus be compensated without shifting the whole image itself.

The offset of the n x n grid is compensated by the process mentioned above. These processes are performed in the registration process 108 as will be explained later. A shift of a multiple of n remains even after these processes, but this shift does not affect the watermark detection because the correlation coefficient between a watermark W and an extracted value V is calculated by shifting the watermark W cyclically as described above. After the registration process above is applied, the M blocks VB_m(m=0, . . . ,M−1) are transformed back to the DCT domain.

Figure 10:
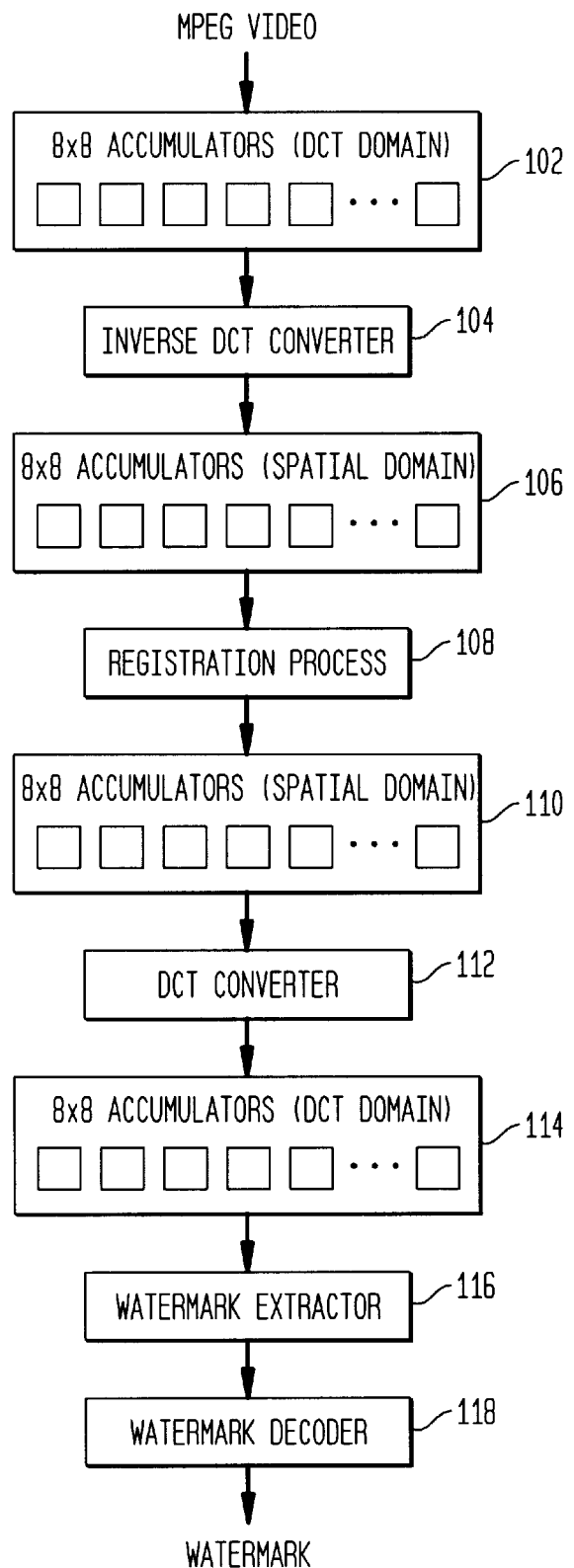
FIG. 10 is a flow diagram of a method of detecting a watermark from MPEG data, with registration.
Figure 11:
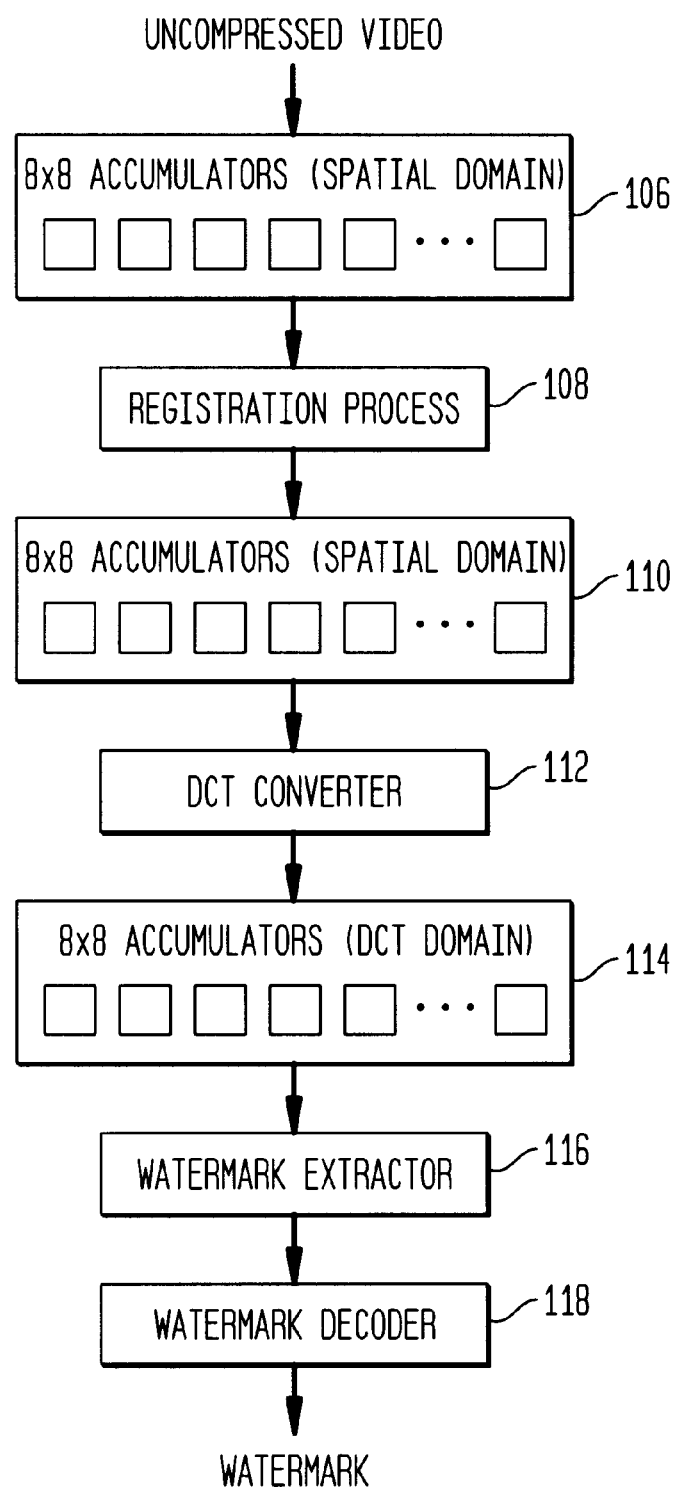
FIG. 11 is a flow diagram of a method of detecting a watermark from uncompressed image data, with registration.

With reference now to FIGS. 10 and 11, there are shown the basic detection algorithms modified to compensate for translational registration. In the case of MPEG video input (FIG. 10), 8×8 DCT blocks obtained from an MPEG video stream are first classified into M groups according to their indices m of the function h_m(i,j), summed within the groups for generating M summed blocks, and the resultant summed blocks are accumulated in 8×8 accumulators 102. The M summed blocks in accumulators 102 must be converted into the spatial domain by performing an inverse DCT operation in inverse DCT converter 104, and accumulated in accumulators 106. Finding the offset value of the 8×8 grid and compensating for the offset is executed for the output from 8×8 accumulators 106 in registration 108 as described above. The registration data outputted from registration process 108 is accumulated in accumulators 110 and converted into the DCT domain in DCT converter 112 for watermark extraction by use of accumulators 114, watermark extractor 116 and watermark decoder 118. In watermark extractor 116, the DCT coefficients outputted from accumulator 114 are classified into N sets according to the functions h_m (i,j) and summed for extracting a watermark. The obtained watermark is provided to watermark decoder 118, in which the processes executed in comparator 84 in FIG. 8 for finding a watermark corresponding to the extracted watermark. The watermark considered to have been inserted is outputted from the watermark decoder 118. In the case of uncompressed input data (FIG. 11), the input data is divided into 8×8 blocks and accumulated in accumulators 106 according to the indices of the functions h_m(i,j), and registration 108 is performed before conversion into the DCT domain in DCT converter 112. The process continues as described above.

While there has been described and illustrated methods of insertion and detection of watermarks in image data, it will be understood by those skilled in the art that variations and modifications are possible without deviating from the spirit and broad teachings of the present invention which shall be limited solely by the scope of the claims appended hereto.

What is claimed is:

1. A method of inserting a watermark signal into video images comprising the steps of:

receiving input video images;

performing discrete cosine transformation (DCT) of said input video images to obtain DCT values of said input video images;

adding watermark signals to said DCT values to obtain DCT values with watermark;

performing an inverse DCT on the DCT values with watermark for generating watermarked images;

subtracting predicted images from said watermarked images for generating residual images;

obtaining the DCT values of residual images and quantizing the DCT values of the residual images;

inverse quantizing the quantized DCT values of the residual images;

performing discrete cosine transformation of the predicted images;

summing the inverse quantized DCT values of the residual images and the DCT of the predicted images for generating DCT coefficients for decoded images;

calculating correction signals from the DCT coefficients of the decoded images and adding the correction signals to the quantized DCT values of the residual images for obtaining an output signal;

inverse quantizing the output signal, inverse DCT the inverse quantized output signal and summing the resultant signal with the predicted images for generating a summed signal;

storing the summed signal in memory for generating the predicted images; and variable length encoding the output signal for providing a watermarked MPEG video signal of the input video images.

2. A method of inserting a watermark signal into video images as set forth in claim 1, where said calculating step generates a negative value as said correction signal when the extracted value exceeds the corresponding target value, and generates a positive value as said correction signal when the extracted value falls short of the corresponding target value.

3. A method of inserting a watermark signal into video images as set forth in claim 2, where said positive value is +1 and said negative value is −1.

4. A method of inserting a watermark signal into video images as set forth in claim 2, where said calculating step generates a zero value as the correction signal if the corresponding quantized DCT values of residual images are zero.

5. A method of inserting a watermark signal into video images as set forth in claim 4, where said positive value is +1 and said negative value is −1.

6. A method of inserting a watermark signal into video images comprising the steps of:

receiving input video images;

performing discrete cosine transformation (DCT) of said input video images to obtain DCT values of said input video images;

adding watermark signals to said DCT values to obtain DCT values with watermark;

performing discrete cosine transformation on predicted images to obtain DCT values of predicted images;

subtracting DCT values of the predicted images from the DCT values with watermark to obtain DCT values of residual images;

quantizing the difference values to obtain quantized DCT values of residual images;

inverse quantizing the quantized DCT values at residual images and summing the inverse quantized DCT values of residual images with the DCT values of predicted images, for generating DCT coefficients for decoded images, calculating correction signals from the DCT coefficients for decoded images;

summing the correction signals with the quantized DCT values of residual images to obtain an output signal;

inverse quantizing the output signal and inverse DCT the inverse quantized output signal and summing the resultant signal with predicted images to provide locally-decoded images;

storing the locally-decoded images in memory for generating the predicted images; and valuable length encoding the output signal to provide a watermarked MPEG video signal of the input video images.

7. A method of inserting a watermark signal into video images as set forth in claim 6, where said calculating step generates a negative value as said correction signal when the extracted value exceeds the corresponding target value, and generates a positive value as said correction signal when the extracted value falls short of the corresponding target value.

8. A method of inserting a watermark signal into video images set forth in claim 7, where said positive value is +1 and said negative value is −1.

9. A method of inserting a watermark signal into video images as set forth in claim 7, where said calculating step generates a zero value as the correction signal if the corresponding quantized DCT values of residual images are zero.

10. A method of inserting a watermark signal into video images as set forth in claim 9, where said positive value is +1 and said negative value is −1.

\* \* \* \* \*